US009500289B2

(12) United States Patent
Canning

(10) Patent No.: US 9,500,289 B2
(45) Date of Patent: Nov. 22, 2016

(54) DEVICE TO PROVIDE FAILSAFE MECHANISM ON A VALVE ACTUATOR ASSEMBLY

(71) Applicant: Dresser, Inc., Addison, TX (US)

(72) Inventor: John Gregory Canning, Kingston, MA (US)

(73) Assignee: Dresser, Inc., Addison, TX (US)

( * ) Notice: Subject to any disclaimer, the term of this patent is extended or adjusted under 35 U.S.C. 154(b) by 135 days.

(21) Appl. No.: 14/282,674

(22) Filed: May 20, 2014

(65) Prior Publication Data

US 2015/0337977 A1 Nov. 26, 2015

(51) Int. Cl.
| | |
|---|---|
| F16K 17/36 | (2006.01) |
| E21B 41/00 | (2006.01) |
| F16K 31/163 | (2006.01) |
| F16K 31/52 | (2006.01) |
| F16K 31/04 | (2006.01) |

(52) U.S. Cl.
CPC ........... *F16K 17/36* (2013.01); *E21B 41/0007* (2013.01); *F16K 31/047* (2013.01); *F16K 31/163* (2013.01); *F16K 31/52* (2013.01)

(58) Field of Classification Search
CPC .................................................... F16K 31/047
USPC .................. 251/67, 68, 69, 279, 77, 129.11, 251/129.12, 129.13; 137/505.47
See application file for complete search history.

(56) References Cited

U.S. PATENT DOCUMENTS

| | | | | |
|---|---|---|---|---|
| 3,000,242 A | * | 9/1961 | Barrett ..................... | B21J 15/14 74/110 |
| 4,043,350 A | * | 8/1977 | Ichimi ..................... | F16K 17/36 137/39 |
| 4,050,670 A | * | 9/1977 | Borg ..................... | F16K 31/145 251/14 |
| 4,650,151 A | | 3/1987 | McIntyre | |
| 8,087,424 B2 | | 1/2012 | Swartzentruber et al. | |
| 2004/0056229 A1 | | 3/2004 | Biester | |

FOREIGN PATENT DOCUMENTS

| | | |
|---|---|---|
| EP | 2491287 | 8/2012 |
| WO | WO2013119127 | 8/2013 |

OTHER PUBLICATIONS

PCT Search Report and Written Opinion issued in connection with corresponding PCT Application No. PCT/US2015/028736 on Jul. 20, 2015.

* cited by examiner

*Primary Examiner* — Mary McManmon
*Assistant Examiner* — Paul J Gray
(74) *Attorney, Agent, or Firm* — Paul Frank + Collins P.C.

(57) ABSTRACT

Embodiments of a safety device that provides a failsafe mechanism on valve actuator assemblies. This failsafe mechanism operates in the event of power loss, or other problems and/or failures, that prevent operation of the drive components. In one embodiment, the safety device is configured to couple the drive components with the valve stem. During normal operation, this configuration changes the position of the valve stem in response to motive action of the drive components. In the event of power loss, the safety device is configured to operate independent of the drive components to change the position of the valve stem and, thus, move the valve to a closed or "safe" position.

19 Claims, 6 Drawing Sheets

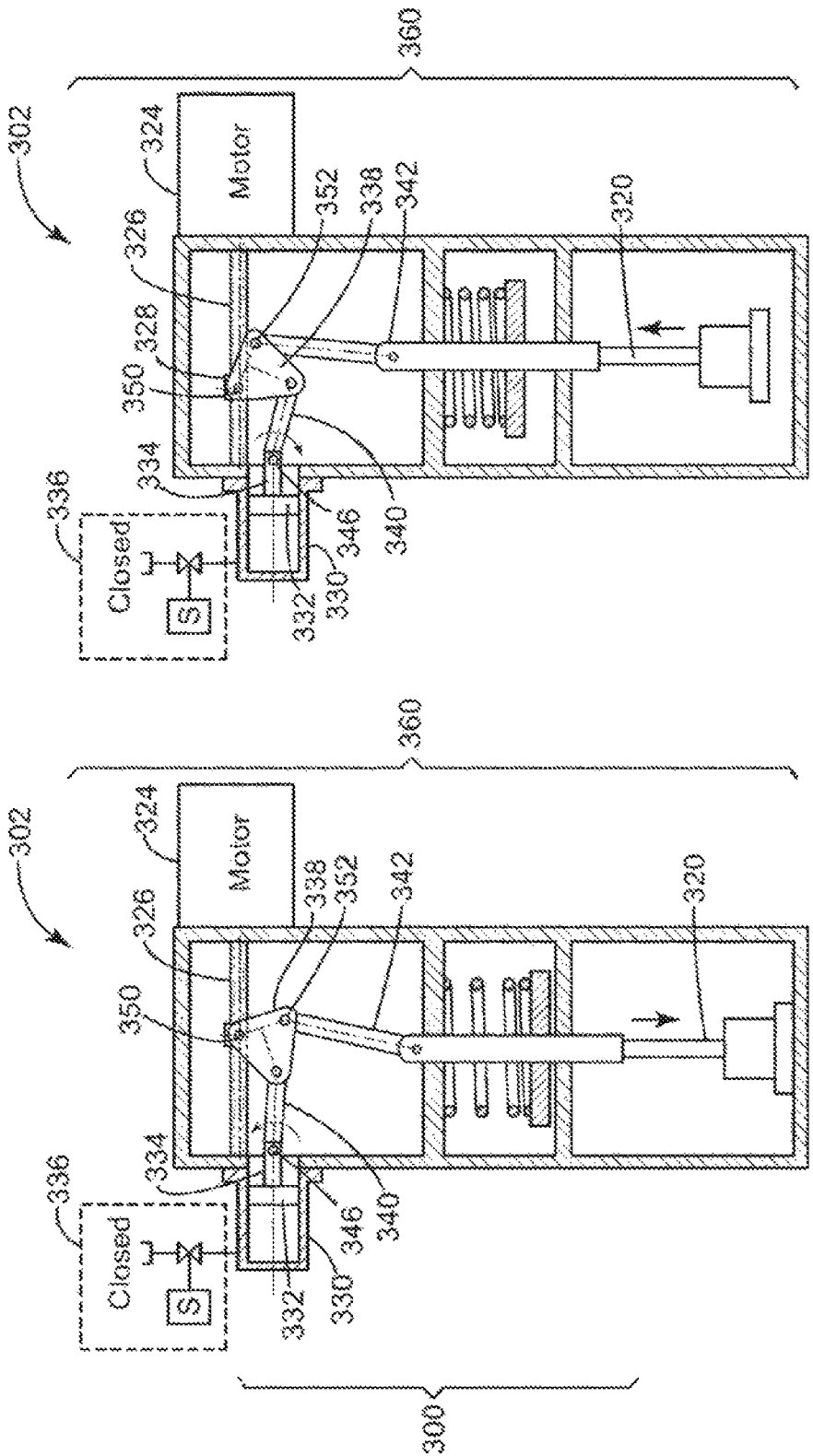

DEVICE TO PROVIDE FAILSAFE MECHANISM ON A VALVE ACTUATOR ASSEMBLY

BACKGROUND

The subject matter disclosed herein relates to actuators with particular discussion below about embodiments of a safety device for use in valve actuator assemblies that, for example, operate valves found in deep-sea systems.

Offshore operations to recover natural resources use equipment that can withstand conditions found at great depths below the surface. This equipment includes valves and valve systems that regulate the flow of fluids. These valves are typically remotely-controlled from the surface, often by way of a valve actuator that couples with the valve. These valve actuators are configured for motive action to regulate whether, and to what degree, the valve is open or closed. Conventional types of valve actuators can incorporate a valve stem and drive components (e.g., hydraulic cylinders, electro-mechanical and mechanical motors, etc.) that effectuate motive action of the valve stem to move the valve. In many cases, an umbilical line from the surface connects the valve actuator with a requisite power source (e.g., electrical power, pressurized fluid, etc.) to operate the drive components.

BRIEF DESCRIPTION OF THE INVENTION

This disclosure describes embodiments of a safety device that provide a failsafe mechanism on valve actuators. This failsafe mechanism operates in the event of power loss, or other problems and/or failures, that prevent operation of the drive components. In one embodiment, the safety device is configured to couple the drive components with the valve stem. During normal operation, this configuration changes the position of the valve stem in response to motive action of the drive components. In the event of power loss, the safety device is configured to operate independent of the drive components to change the position of the valve stem and, thus, move the valve to the closed position.

BRIEF DESCRIPTION OF THE DRAWINGS

Reference is now made briefly to the accompanying drawings, in which:

FIG. 4 depicts the safety device of FIG. 3 in a first operating condition with the actuator assembly configured to position a corresponding valve in a closed position;

FIG. 5 depicts the safety device of FIG. 3 in the first operating condition with the actuator assembly configured to position the corresponding valve in an open position;

Where applicable like reference characters designate identical or corresponding components and units throughout the several views, which are not to scale unless otherwise indicated.

DETAILED DESCRIPTION

Figure 1:
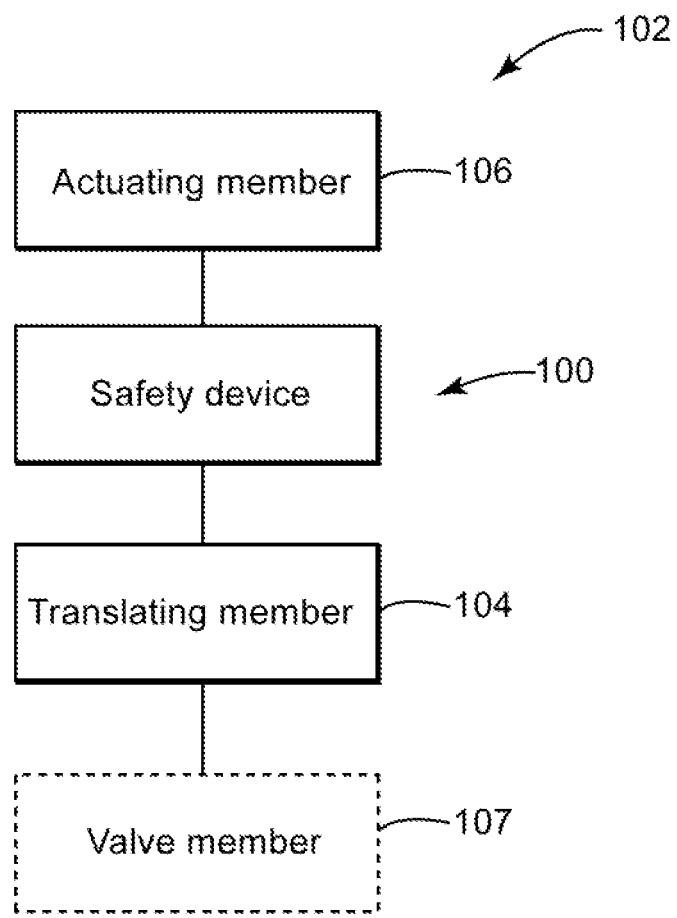
FIG. 1 depicts a schematic diagram of an exemplary embodiment of a safety device for use on submersible actuator assembly.

FIG. 1 depicts a schematic diagram to illustrate, at a high level, an exemplary embodiment of a safety device 100 for use with submersible valve actuators and related components. The safety device 100 is part of a valve actuator assembly 102 that has a translating member 104 and an actuating member 106. The actuator assembly 102 can incorporate into various systems including systems with a valve member 107 (also "valve 107") that regulates flow of a fluid. As noted herein, the valve actuator assembly 102 may have particular application in sub-sea systems like manifold and pipeline sled valve systems. These types of systems are often disposed underwater as part of oil & gas recovery and production facilities. During normal operation, the actuating member 106 moves the translating member 104 to open and close the valve 107 in the system.

Embodiments of the safety device 100 operate as a failsafe mechanism that can intervene in response to problems that may occur during operation of the actuator assembly 102 (and/or the valve 107 and/or systems, generally). These embodiments are configured to couple with each of the translating member 104 and the actuating member 106. This configuration facilitates movement of the corresponding valve 107. As the failsafe mechanism, the safety device 100 is configured to move the translating member 104 independent of the actuating member 106. This feature automatically places the translating member 104 in a safe condition that, typically, shuts or closes the valve 107 coupled with the actuator assembly 102. This functionality affords the valve actuator assembly 102 with an override feature that can operate in the absence of power and/or other external input (or stimulus) on the actuating member 106. This override feature makes the actuator assembly 102 beneficial for sub-sea applications because the safety device 100 can readily address, e.g., failures in components of the actuator assembly 102 that may occur due to power loss. Indeed, because the safety device 100 works independent of the actuator member 106 to move the translating member 104 to the safe condition, the safety device 100 does not need to incorporate hydraulic components or to provide specific design to accommodate for high pressure environments that are often necessary for conventional safety shut-offs and related actuator components.

Figure 2:
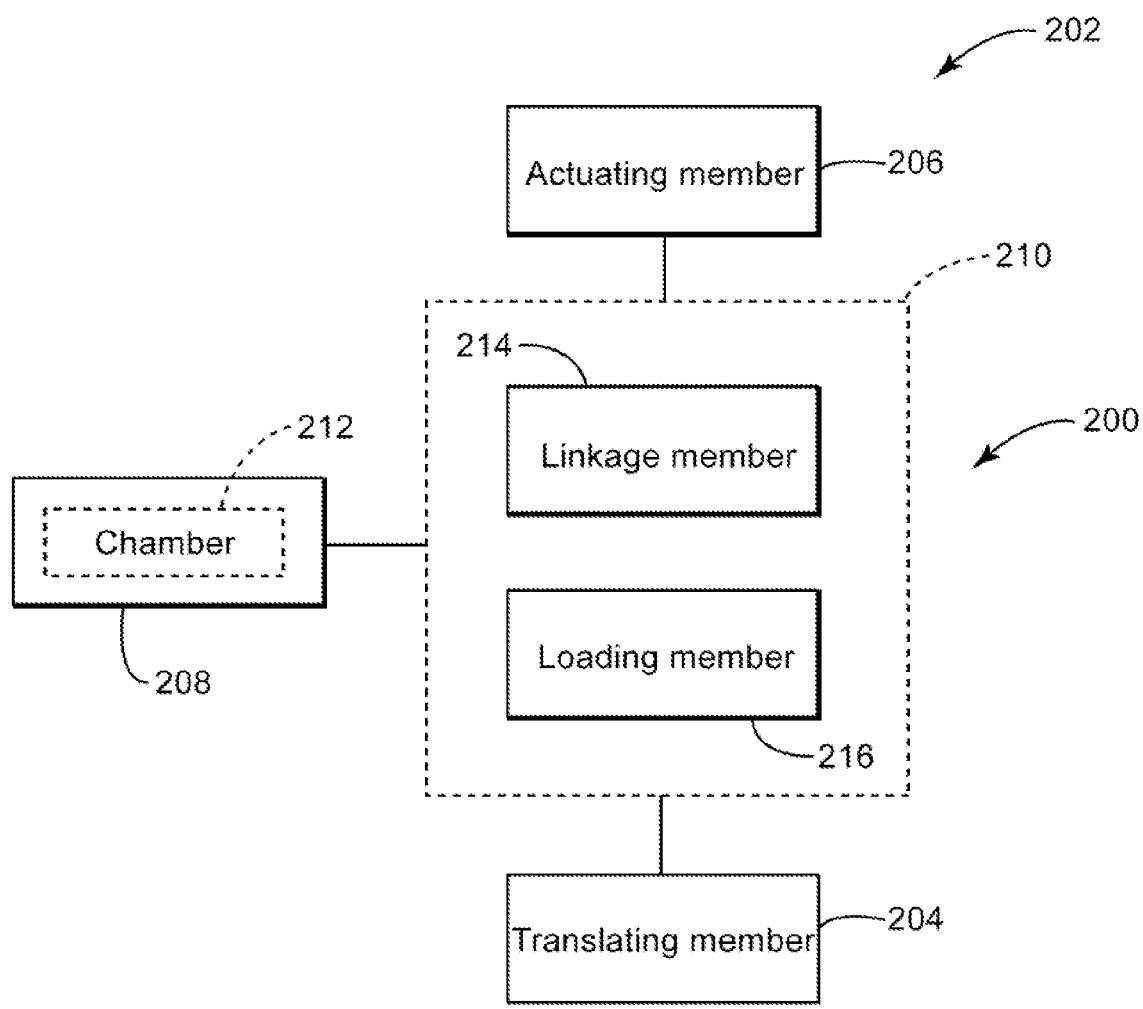
FIG. 2 depicts a schematic diagram of another exemplary embodiment of a safety device for use on submersible actuator assembly.

FIG. 2 also shows a schematic diagram of an exemplary embodiment of a safety device 200 with one configuration of components to provide this override feature. These components include a regulating member 208 and a transfer member 210. The transfer member 210 is configured to couple the regulating member 208 with each of the translating member 204 and the actuating member 206. The regulating member 208 can have a chamber 212 that defines a volume that can retain a fluid (e.g., liquid, gas, etc.). The transfer member 210 can include a linkage member 214 and a loading member 216 that generates a biasing force. Together, the linkage member 214 and the loading member 216 are configured to operate to change the volume of the chamber 212 from a first volume to a second volume that is less than the first volume. In one implementation, the safe condition for the translating member 204 corresponds with the second volume in the chamber 212.

Figure 3:
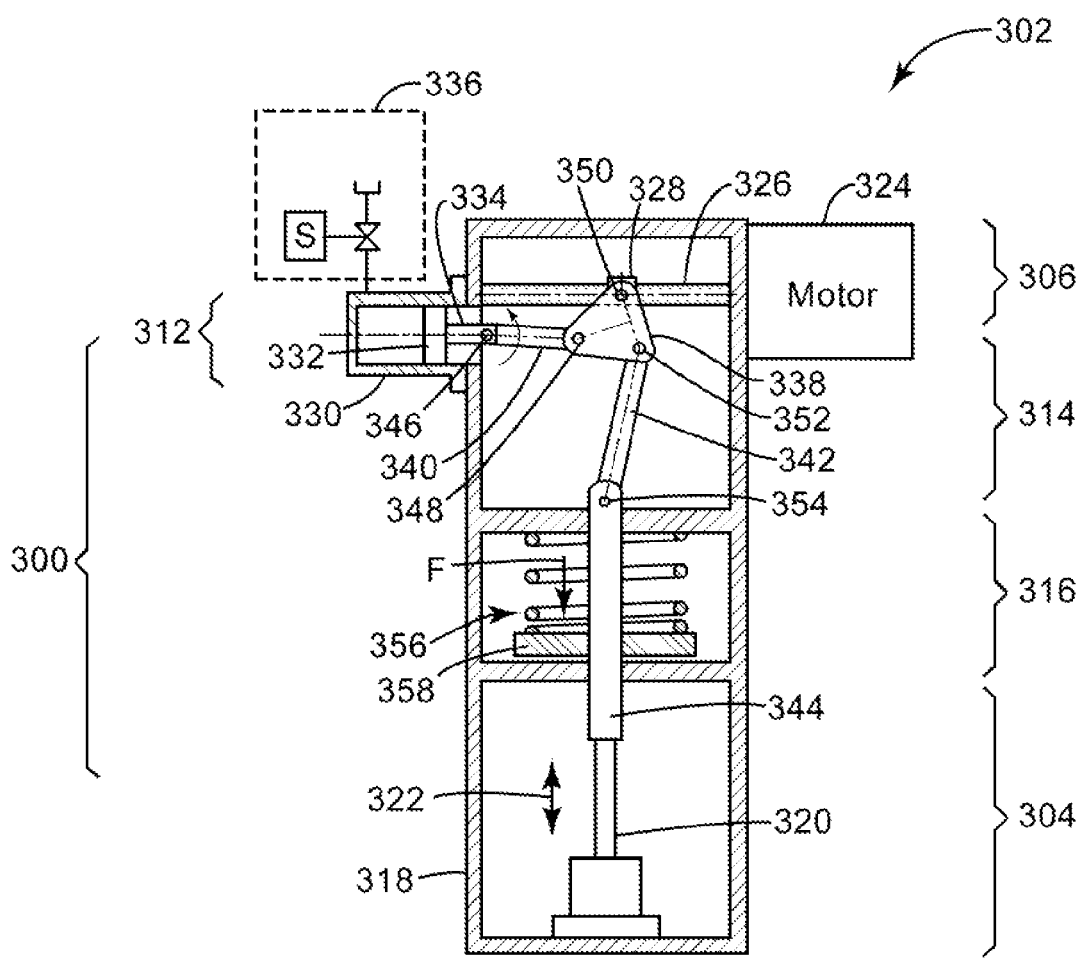
FIG. 3 depicts a elevation, cross-section view of an exemplary embodiments of a safety device as part of a actuator assembly.

FIG. 3 depicts an exemplary embodiment of a safety device 300 shown as part of the valve actuator assembly 302 by way of an elevation, cross-section view. This embodiment utilizes a configuration of components that mechanically implements the override feature. This configuration can operate independent of the actuating member 306 to regulate the position of a valve to the closed position.

In FIG. 3, the valve actuator assembly 302 has a housing 318 that can enclose one or more of the working components of the safety device 300. The translating member 304 can include a valve stem 320 that can translate relative to, for example, the housing 318, as generally indicated by the arrow enumerated by the numeral 322. The actuator member 306 can embody a screw assembly with a motor 324, typically an electric motor, a threaded screw member 326, and a block member 328. As also shown in FIG. 3, the chamber 312 can embody a cylinder member 330 that can couple with the housing 318. The cylinder member 330 has a piston assembly having a piston member 332 and piston rod 334. An operator 336 may couples with the cylinder 330 to regulate flow of fluid into and out of the volume of the cylinder member 330. Examples of the operator 336 can include solenoids and like valves that operate between states (e.g., a first state and a second state) in response to an electrical stimulus.

FIG. 3 also shows that the linkage member 314 can have a yoke member 338 that couples with the block member 328 and to one or more link members (e.g., a first link member 340 and a second link member 342). The link members 340, 342 are configured to couple with, respectively, the piston rod 334 and a stem link member 344. The connection between the link member 342 and stem link member 344 operates to couple the valve stem 320 with the yoke member 338. In one construction, the safety device 300 incorporates one or more articulating joints (e.g., a first joint 346, a second joint 348, a third joint 350, a fourth joint 352, and a fifth joint 354). This construction is configured to allow relative movement (e.g., relative rotation) between the corresponding members that couple at the respective joints. In one embodiment, the loading member 316 can include a resilient member 356 that is configured to apply a biasing force F to a biasing member 358, which itself couples with the stem link member 344. This arrangement of the biasing member 358 is configured to direct the biasing force F generally downward in order to place the translating member 304 in the safe condition. Examples of the resilient member 356 can include compression springs and like devices with properties sufficient to generate forces necessary to bias the translating member 304 to the closed position; however, this disclosure also contemplates use of any device (e.g., pneumatic cylinders) that can generate the biasing force consistent with operation of the safety device 300 as well as variants and embodiments contemplated herein.

As noted herein, the valve actuator assembly 302 is configured to actuate a corresponding valve to regulate flow of fluids. Normal operation of the valve actuator assembly 302, for example, utilizes the motor 324 to rotate the screw member 326, which in turn translates the block member 328. The yoke member 338 travels with the block member 328. The configuration of the linkage member 316 with various joints 346, 348, 350, 352, 354 transfers the movement of the yoke member 338 to displace the valve stem member 320. In some scenarios, the motor 324 can seize and/or cease operation, e.g., due to loss of power through the umbilical line and/or any corresponding remote power system (e.g., a battery back-up). These scenarios can leave the corresponding valve open or "not closed," often without any mechanism to close the corresponding valve until power is restored and/or the operational problem is resolved. The safety device 300, however, is configured to utilizes the biasing force F to move the valve stem member 320 independent of the motor 324. This feature automatically closes the corresponding valve.

FIGS. 4, 5, 6, and 7 show the safety device 300 in various operating conditions to illustrate an exemplary implementation of the failsafe mechanism on the valve actuator assembly 302. FIGS. 4 and 5 depict the safety device 300 in a first operating condition 360 in which the valve stem member 320 translates to actuate a corresponding valve to close (FIG. 4) and open (FIG. 5). In the first operating condition 360, the safety device 300 is configured to prevent fluid flow from the cylinder member 330. This function may be achieved by placing the operator 336 in a first state that prevents fluid flow out of the volume. In this first state, the piston member 332 does not translate in the cylinder member 330, thereby maintaining the piston member 332 in a first position that corresponds with a first volume in the cylinder member 330 and with a first location for the joint 346.

Travel of the block member 328 in a first direction (i.e., from left to right in the diagram of FIG. 4) causes the yoke member 338 to rotate about the third joint 350. With the piston member 332 in the first position and the first joint 346 in the first location, the first link member 340 rotates upwardly about the first joint 346, operating as a first pivot. This action of the first link member 340 causes the fourth joint 352 to displace downwardly, which in turn causes the valve stem member 320 to move downwardly, via displacement of the second link member 342, to close the corresponding valve (e.g., valve 107 of FIG. 1). Travel of the block member 328 in a second direction (i.e., from right to left in the diagram of FIG. 5) also causes the yoke member 338 to rotate about the third joint 350. With the piston member 332 in the first position and the first joint 346 in the first location, the first link member 340 rotates downwardly about the first joint 346 (as the first pivot). This action of the first link member 340 causes the fourth joint 352 to displace upwardly, which in turn causes the valve stem member 320 to move upwardly, via displacement of the second link member 342, to open the corresponding valve (e.g., valve 107 of FIG. 1).

Figure 7:
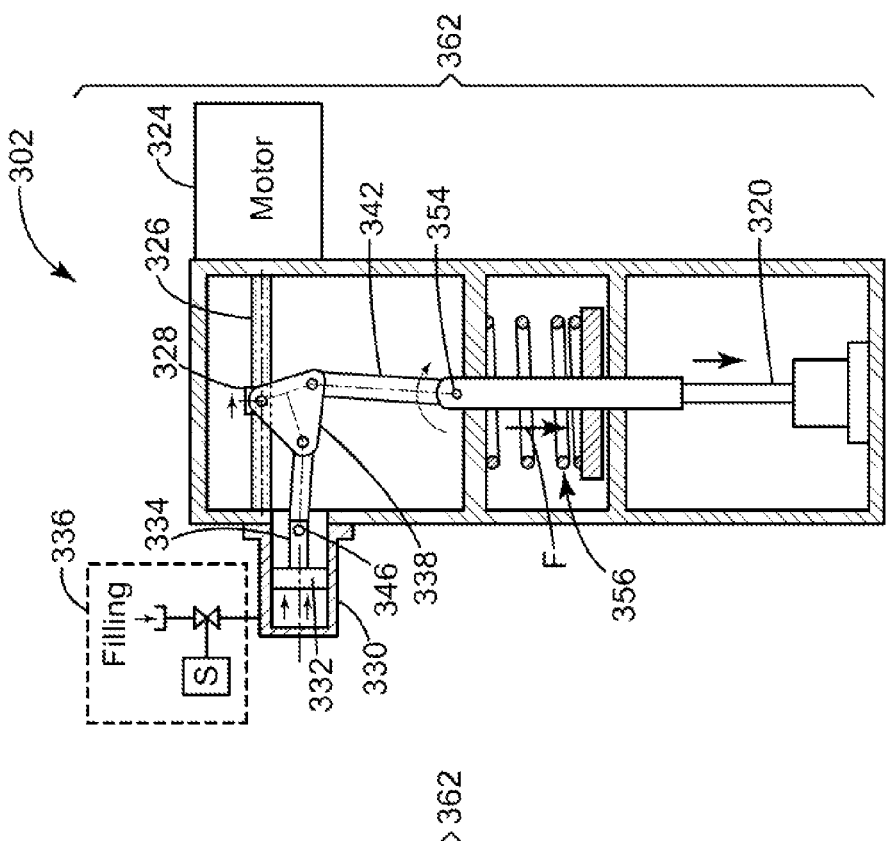
FIG. 7 depicts the safety device of FIG. 3 in the second operating condition with the actuator assembly configured to reset the failsafe mechanism for normal operation.
Figure 6:
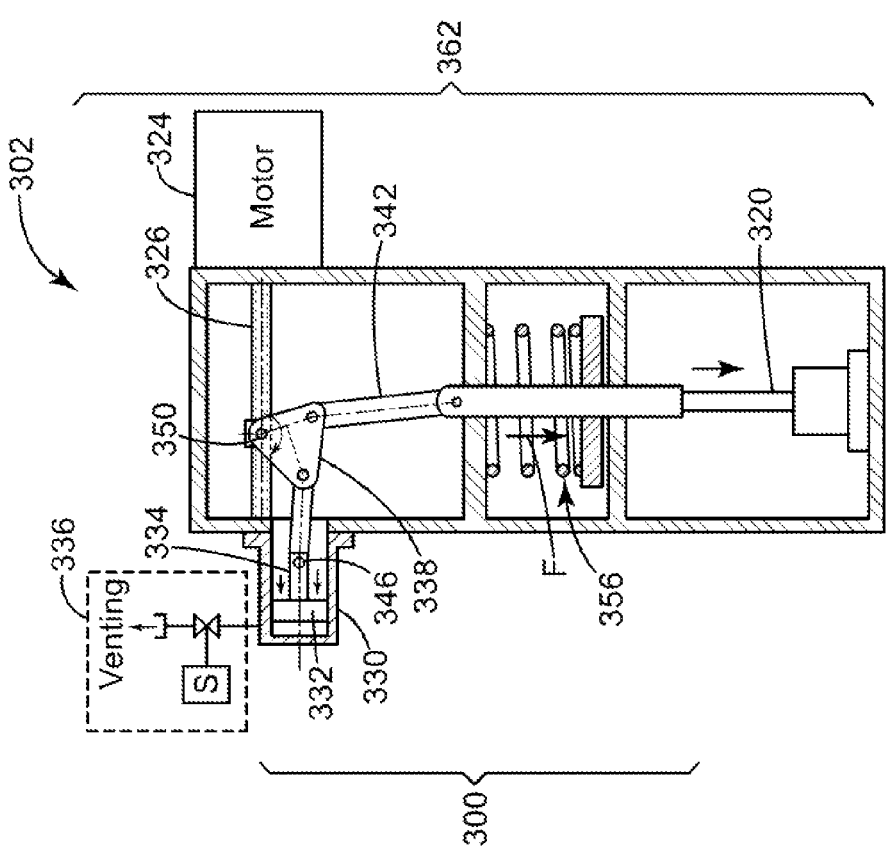
FIG. 6 depicts the safety device of FIG. 3 in a second operating condition with the actuator assembly configured to position the corresponding valve in the closed position.

The diagrams of FIGS. 6 and 7 depict the safety device 300 in a second operating condition 362 that implements the override feature. Examples of this override feature can occur in response to problems and/or failures that occur on the valve actuator assembly 302. In the second operating condition 362, the safety device 300 is configured to allow fluid flow from the cylinder member 330. This function may be achieved by placing the operator 336 in a second state that allows fluid flow out of the volume of chamber 312 (FIG. 3). This second state relieves fluid pressure to allow the piston member 332 to translate to a second position that corresponds with a second volume in the cylinder member 330 and with a second location for the joint 346. In FIG. 6, with the piston member 332 in the second position and the first joint 346 in the second location, the biasing force F of the resilient member 356 causes the yoke member 338 to rotate, or pivot, about the third joint 350, operating as a second pivot. This action of the yoke member 338 causes the valve stem member 320 to move downwardly, via the second link member 342 to the safe condition. In one example, the downward movement of the valve stem member 338 can close the corresponding valve.

As best shown in FIG. 7, the resilient member 356 is configured to generate the biasing force F with sufficient magnitude to also allow recovery of the valve actuator assembly 302 after initiation of the failsafe mechanism. In one implementation, the biasing force F maintains the valve stem member 320 in the safe condition as the block member 328 translates, e.g., from left to right in the diagram of FIG. 7. The action of the block member 328 may occur under operation of the motor 324, which rotates the screw member 326. With the valve stem member 320 static, the second link member 342 rotates about the fifth joint 354, operating as a third pivot. The movement of the block member 328 moves the yoke member 338, which changes the position of the piston member 332, e.g., from the second position to the first position in the cylinder 330 Collectively, this operation draws fluid into the cylinder member 330. In one embodiment, when the volume of the chamber 312 (FIG. 3) reaches the first volume, the operator 336 can change from the second state to the first state, effectively sealing the cylinder member 330 and readying the valve actuator assembly 302 in the first operating condition 360 for normal operation.

Figure 8:
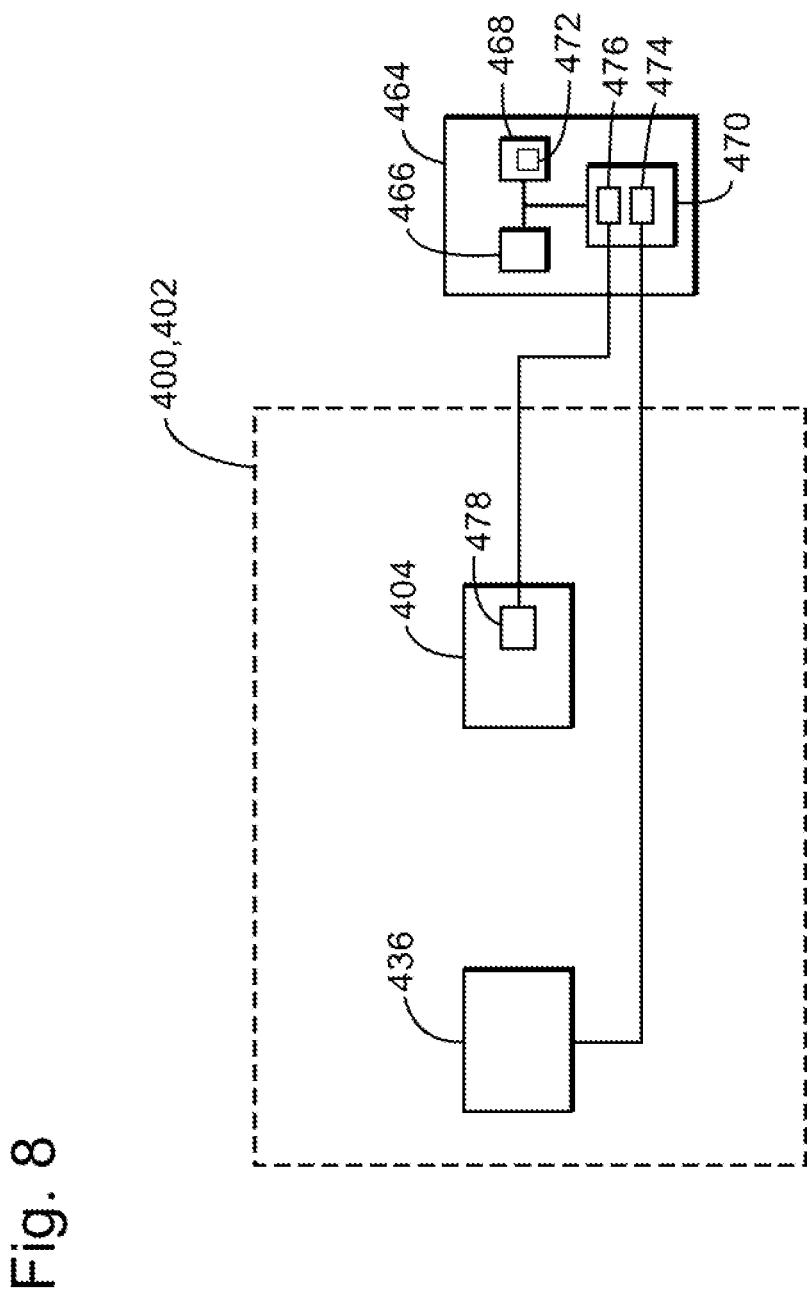
FIG. 8 depicts a schematic diagram of an exemplary embodiment of a safety device as part of an integrated control structure.

FIG. 8 depicts a schematic diagram of an exemplary embodiment of a safety device 400 to provide an illustrative example of a control scheme to execute the operating conditions discussed above and contemplated herein. This control scheme deploys a control device 464 with a processor 466, memory 468, and control circuitry 470. The memory 468 can include executable instructions 472 in the form of software, firmware, and related instructions that are configured to be executed by the processor 466. In one example, the control circuitry 470 includes operator circuitry 474 and motor circuitry 476 that couple with, respectively, the operator 436 and an encoder 478 on the motor 424.

The control device 464 can operate to place the actuator assembly 402 in one or more of the various operation configurations. In one implementation, the control circuitry 470 can generate an input that instructs the operator 436 to assume, e.g., one of the first state or the second state. The input may, for example, cause the operator 436 to the second state in response to power loss (and/or related problematic condition). Once the problem is cleared, the input can instruct the operator 436 to the first state. The control device 464 can also generate a second input that instructs operation of the motor 424 to reset the safety device 400 as set forth above.

In view of the foregoing, embodiments of the proposed safety device offers protection against events, e.g., power failure, on valve actuators (and related devices) that may be generally inaccessible. Implementation of these embodiments on deep-sea valve systems, for example, can protect against power failures that would otherwise render the valve actuator inoperable to properly actuate the valve to a safe (often closed) position. The safety device, however, can close the valve, or position the valve is some safe position or condition, until appropriate measures are available to reset and/or restore proper operation of the valve actuator.

As used herein, an element or function recited in the singular and preceded with the word "a" or "an" should be understood as not excluding plural said elements or functions, unless such exclusion is explicitly recited. Furthermore, references to "one embodiment" of the claimed invention should not be interpreted as excluding the existence of additional embodiments that also incorporate the recited features. Moreover, directional terms, language, and elements, including the terms "upwardly" and "downwardly," are used for exemplary purposes only as relates to the coordinate system(s) shown in the figures.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A valve actuator assembly, comprising:
a translating member;
an actuating member that is configured to move the translating member; and
a safety device that is configured to couple the translating member with the actuating member, the safety device comprising a fluid chamber, a piston member disposed in the fluid chamber, a piston rod coupling to a first end of the piston member, and a yoke member coupling to a second end of the piston rod, the actuating member, and the translating member,
wherein the piston member and the piston rod are configured to remain stationary as the actuating member moves the translating member between a first position and a second position, and
wherein the safety device is configured for the yoke member to move in response to movement of the translating member to the second position and independent of the actuating member.

2. The valve actuator assembly of claim 1, wherein the piston member forms a volume in the fluid chamber comprising a first volume and a second volume that is less than the first volume, and wherein the second position corresponds to the second volume of the fluid chamber.

3. The valve actuator assembly of claim 2, wherein the safety device comprises a loading member coupled to the translating member, wherein the loading member is configured to apply a biasing force that moves the translating member to the second position.

4. The valve actuator assembly of claim 3, wherein the loading member comprises a resilient member.

5. The valve actuator assembly of claim 3, wherein the safety device is configured to transfer the biasing force to the piston member to move the piston member in the chamber from a first piston position to a second piston position that corresponds with the second volume.

6. The valve actuator assembly of claim 2, wherein the safety device is configured with a linkage comprising the yoke member and a plurality of link members, and wherein the link members couple the yoke member with the translating member and the second end of the piston rod.

7. The valve actuator assembly of claim 6, wherein the linkage comprises joints that are configured to allow the link members and the yoke member to rotate relative to one another.

8. A valve actuator assembly, comprising:
a regulating member comprising a chamber, a piston member disposed in the chamber, and a piston rod with a first end coupled with the piston member, the chamber having a volume configured to retain a fluid, the volume having a first volume and a second volume;

a linkage member coupled with the regulating member;
a translating member coupled with the linkage member, the translating member configured to move between a first position and a second position that is different from the first position; and
a loading member configured to generate a biasing force,
wherein the piston member and the piston rod are configured to remain stationary as the actuating member moves the translating member between the first position and the second position,
wherein the linkage member is configured to direct the biasing force to the piston member to change the volume from the first volume to the second volume,
wherein the second position corresponds with the second volume, and
wherein the linkage member comprises a yoke member that couples to a second end of the piston rod, the actuating member, and the translating member, and is configured to move in response to movement of the translating member to the second position and independent of the actuating member.

9. The valve actuator assembly of claim 8, wherein the second volume is smaller than the first volume.

10. The valve actuator assembly of claim 8, further comprising an actuator member, wherein the yoke member couples with the actuator member, and wherein the translating member is configured to move independent of the actuator member in response to the biasing force.

11. The valve actuator assembly of claim 8, wherein the regulating member comprises an operator having a first state and a second state that correspond to, respectively, the first volume and the second volume, and wherein the second state configures the operator to allow fluid to evacuate the volume.

12. The valve actuator assembly of claim 11, wherein the linkage member is configured to direct the biasing force to the piston rod to move the piston member to form the second volume.

13. The valve actuator assembly of claim 11, wherein the linkage member comprises a first link member and a second link member, one each couple with the piston rod and the translating member.

14. A system, comprising:
a valve configured with an open position and a closed position;
a valve actuator assembly coupled with the valve to move the valve between the open position and the closed position, the valve actuator assembly comprising,
a translating member,
an actuating member that is configured to move the translating member to change the position of the valve between the open position and the closed position, and
a safety device that is configured to allow the translating member to move independent of the actuating member to change the valve to the closed position, the safety device comprising a chamber, a piston member disposed in the chamber, a piston rod securing to a first end of the piston member, and a yoke member coupling to a second end of the piston rod, the actuating member, and the translating member,
wherein the piston member and the piston rod is configured to remain stationary as the actuating member moves the translating member to move the valve between the open position and the closed position, and
wherein the safety device is configured for the yoke member to move in response to movement of the translating member to the second position and independent of the actuating member.

15. The system of claim 14, wherein the safety device comprises a cylinder member forming the chamber and a linkage that couples the yoke member with both the translating member with the piston rod.

16. The system of claim 15, wherein the linkage comprises a first link member coupled with each of the second end of the piston rod and the yoke member at a joint that is configured to allow the first link member and the yoke member to rotate relative to one another.

17. The system of claim 16, wherein the linkage comprises a second link member that rotatably couples with the translating member and the yoke member.

18. The system of claim 16, further comprising a resilient member that is configured to generate a biasing force, wherein the linkage is configured to direct the biasing force to change the piston member from a first piston position to a second piston position in the chamber.

19. The system of claim 18, wherein the resilient member comprises a compression spring.

* * * * *